April 8, 1952 B. JORGENSEN 2,591,827
FLUID PRESSURE CONTROLLING MECHANISM
Filed July 25, 1946 2 SHEETS—SHEET 1
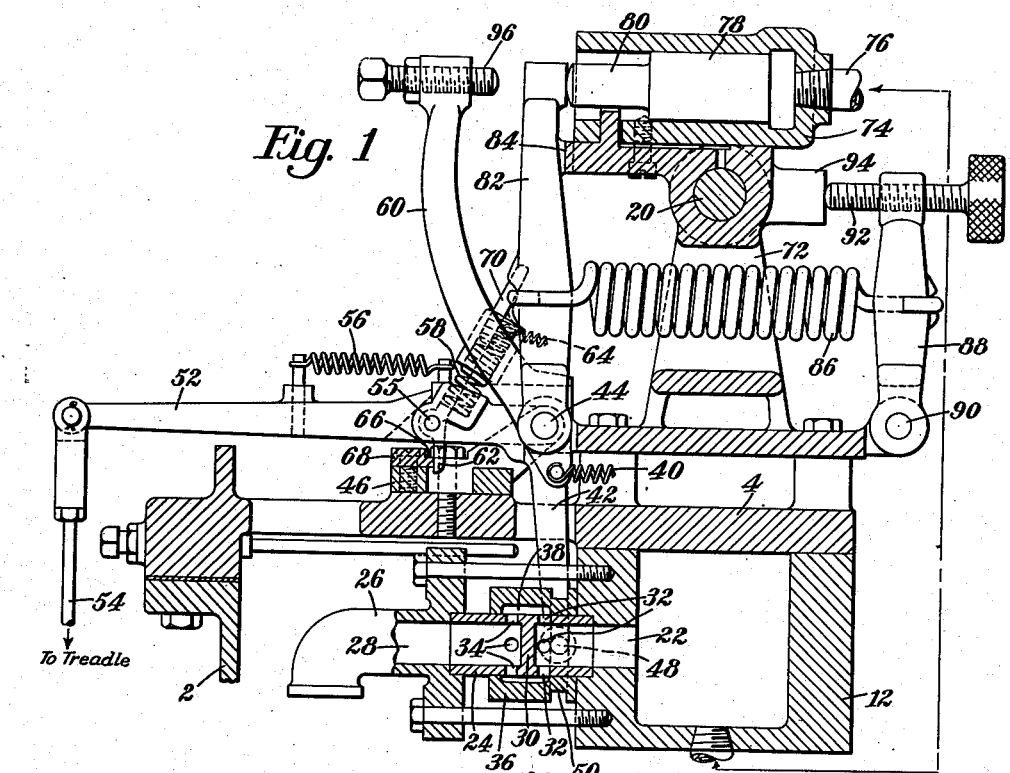
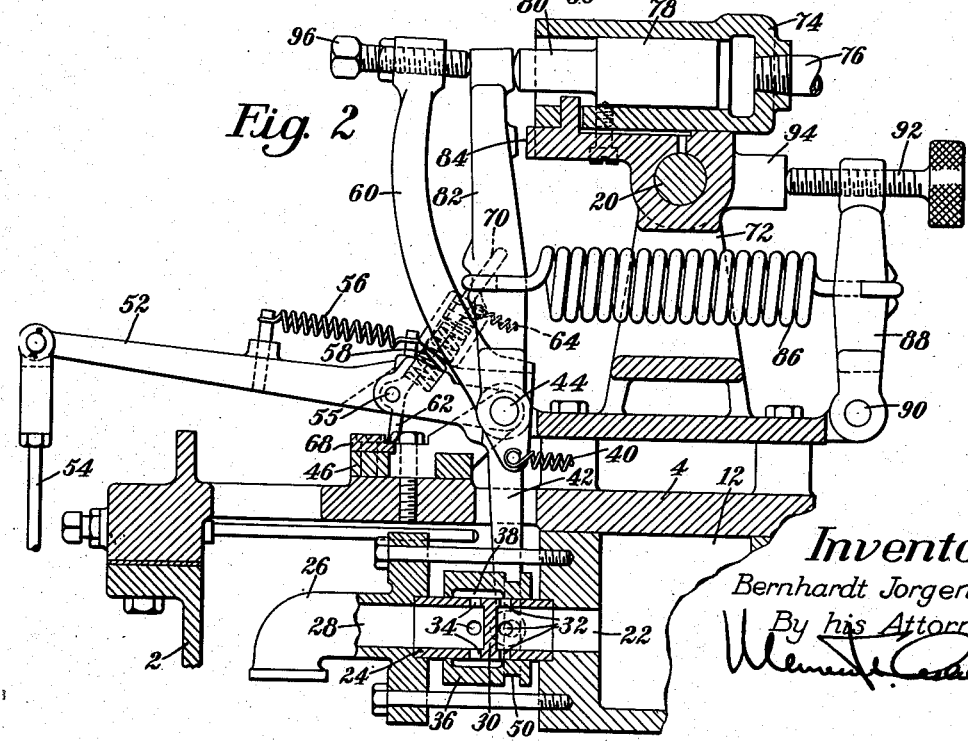
Inventor
Bernhardt Jorgensen
By his Attorney Inventor
Bernhardt Jorgensen
By his Attorney Patented Apr. 8, 1952

2,591,827

UNITED STATES PATENT OFFICE 2,591,827

FLUID PRESSURE CONTROLLING MECHANISM

Bernhardt Jorgensen, Marblehead, Mass., assignor to United Shoe Machinery Corporation, Flemington, N. J., a corporation of New Jersey Application July 25, 1946, Serial No. 686,256

10 Claims. (Cl. 103—42)

This invention relates to fluid-pressure-controlling mechanisms adapted especially for use in machines which are operated by fluid pressure. The invention is herein shown as embodied in mechanism constructed in some respects in accordance with the disclosure of United States Letters Patent No. 2,324,509, granted on July 20, 1943 on an application of mine and showing a fluid-operated machine for use in the manufacture of shoes, but it will be understood that the invention is capable of different embodiments and is adapted for use in various kinds of fluid-operated machines.

In the machine shown in the above-mentioned Letters Patent operating fluid, preferably light oil, is delivered by a continuously driven pump from a reservoir or sump to a manifold from which valve-controlled conduits lead to a plurality of servo-motors operated in time relation to one another in a cycle of operations of the machine. When the machine is idle the fluid returns from the manifold to the sump through a by-pass controlled by a sliding sleeve valve which is open at that time to permit unobstructed flow of the fluid and thus to prevent the development of any substantial fluid pressure. When the machine is to be operated the valve is moved by the operator to closed position to stop the flow through the by-pass and thus to cause the development of fluid pressure, the excess fluid then returning to the sump through another by-pass controlled by a relief valve which is opened against the resistance of a spring by pressure of the fluid against it and serves to limit the operating pressure of the fluid.

The present invention provides means whereby a single valve performs the functions of both the above-mentioned valves. The construction herein shown, similarly to the disclosure of the above-mentioned Letters Patent, includes a sliding sleeve valve for controlling the by-pass through which the fluid normally flows without the development of any substantial fluid pressure, and treadle-operated means including a lever arranged to act on the valve through a spring to move it toward closed position to cause the development of fluid pressure, the lever being held by a latch against return movement. To cause this valve to function also as a relief valve for limiting the pressure during the operation of the machine, there is further provided means controlled by the fluid pressure and arranged to act against the resistance of the above-mentioned spring to hold the valve at times partially open. As herein shown, this means comprises a piston movable by the fluid against the resistance of another spring which is adjustable to vary the maximum pressure developed.

The novel features of the invention, including various novel details of construction and combinations of parts, will now be more particularly described with reference to the accompanying drawings and thereafter pointed out in the claims.

In the drawings,

Fig. 1 is a view partly in elevation and partly in section of fluid-pressure-controlling mechanism in which the invention is embodied, the parts being shown in the positions which they occupy when the fluid is under no substantial pressure;

Fig. 2 is a view similar to Fig. 1, but illustrating conditions when the fluid is under pressure.

Figure 3:
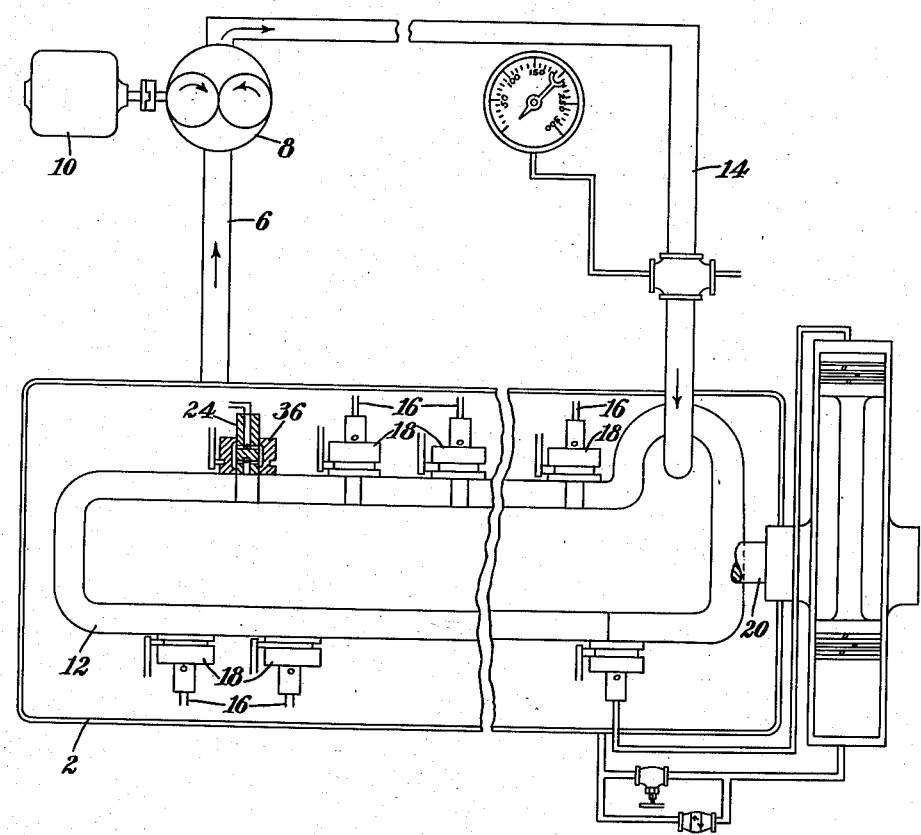
Fig. 3 is a diagrammatic view illustrating the relation of the fluid-pressure-controlling mechanism to other portions of the fluid-pressure system of the machine shown in the above-mentioned Letters Patent.

The machine to which the invention is shown as applied includes a casting 2 secured on the lower face of a fixed horizontal plate 4 and serving as an open reservoir or sump containing a supply of fluid, such as oil, which is conducted therefrom through a conduit 6 (Fig. 3) to a rotary pump 8 driven continuously at a constant speed by an electric motor 10. Also secured on the lower face of the plate 4 is a casting 12 located within the upper portion of the sump 2 and serving as a manifold to which the fluid is delivered by the pump through a conduit 14. From the manifold a plurality of conduits 16 controlled by valves 18 lead to servo-motors (not shown) by which movements are imparted to various operating instrumentalities of the machine, as disclosed in the previously mentioned Letters Patent. As also therein disclosed, the valves 18 are operated in predetermined time relation to one another in the course of a cycle of automatic operations of the machine, alternately admitting fluid under pressure from the manifold to the different servo-motors and returning the fluid from the motors to the sump 2. The valves are controlled by members (not shown) mounted on a shaft 20 which makes one revolution in each cycle of operations.

When the machine is not operating a free outlet is provided for return of the fluid from the manifold to the sump to prevent the development of any substantial fluid pressure in the manifold. For this purpose a port 22 in the manifold communicates with one end of a tubular member 24 clamped between the manifold and a coupling 26, the coupling having therein a passage 28 communicating with the other end of the tubular member and arranged to serve as a by-pass through which the fluid is returned to the sump. Midway between its opposite ends the tubular member is divided by a partition 30, and extending through it at the opposite sides of this partition respectively are two sets of ports 32 and 34. Slidingly mounted on the tubular member is a sleeve valve 36 so formed and arranged as to be unaffected by any pressure of the fluid against it, the valve having therein an annular recess 38 arranged to bridge the two sets of ports 32 and 34 and thus to permit the fluid to flow freely from the manifold to the sump when the valve is in what may be termed its normal or open position (Figs. 1 and 3). In this position, determined by its engagement with the wall of the manifold, the valve is yieldingly held by a spring 40 connected to an arm 42 which is pivotally mounted on a pin 44 supported by a bracket 46 on the plate 4 and is provided at its lower end with a pin 48 extending into an annular groove 50 in the valve.

When the machine is to be operated the valve 36 is moved toward what may be termed its closed position, i. e., toward the left with reference to Fig. 1 over the ports 32, to obstruct the flow of fluid through the by-pass 28 and thus to cause the development of fluid pressure in the manifold 12. For this purpose there is pivotally mounted on the pin 44 a lever 52 which, through a rod 54, is swung upwardly by depression of a treadle (not shown). For a reason explained in the previously mentioned Letters Patent the lever 52 is shown as a two-part lever, the two parts thereof being pivotally connected together by a pin 55 and being held by a spring 56 in a fixed relation to each other determined by the interengagement of abutting surfaces formed respectively on the different parts. As far as the present invention is concerned, however, the two parts of the lever may be regarded as one. When the lever is swung upwardly as above described it acts through a spring 58 to swing the arm 42 toward the left against the resistance of the spring 40 and thereby to move the valve 36 toward closed position. In the construction herein shown the spring 58 is mounted at one end in a socket in the lever 52 and at its other end in a socket formed in an upwardly extending arm 60 which is integral with the arm 42, the two arms 42 and 60 thus being parts of a lever which is fulcrumed between its opposite ends on the pin 44. Return movement of the lever 52 is prevented by a latch 62 which is pivotally mounted on the pin 55 and, as shown in Fig. 2, is swung by a spring 64 into a position over a shoulder 66 (Fig. 1) formed on a plate 68 fast on the bracket 46, the spring being connected to an arm 70 which is integral with the latch. Substantially at the end of the cycle of operations an arm (not shown) on the valve-controlling shaft 20 acts on the arm 70 to swing the latch 62 from over the shoulder 66 and thus to cause the valve 36 to be returned by the spring 40 to its initial position where it again permits a free flow of fluid from the manifold 12.

As thus far described the construction herein shown is substantially like the earlier construction disclosed in the previously mentioned Letters Patent, except that in the latter there is no upwardly extending arm 60 and the spring corresponding to the spring 58 is differently arranged. In the operation of the earlier construction the valve corresponding to the valve 36 is moved by the treadle to fully closed position and is maintained in that position throughout the cycle of operations of the machine, the excess fluid returning from the manifold to the sump past an additional spring-controlled relief valve which determines the maximum pressure developed. For purposes of this invention there is provided a construction whereby the function of such a relief valve is performed also by the valve 36. Fastened on a bracket 72 which is mounted on the plate 4 and serves as a bearing for the previously mentioned shaft 20 is a cylinder 74 one end of which is in communication with the manifold 12 through a pipe 76. Mounted in this cylinder is a piston 78 having a diametrically reduced end portion 80 arranged to engage the upper end of an arm 82 which is pivotally mounted at its lower end on the pin 44. The arm 82 is held normally against a shoulder 84 on the bracket 72 by a spring 86 one end of which is connected to another arm 88 pivotally mounted on a pin 90 on the bracket 72 and having threaded in its upper end a screw 92 arranged to engage a boss 94 on the bracket. It will thus be seen that by means of the screw 92 the tension of the spring 86 may be varied. When the valve 36 is moved by the treadle toward closed position, as hereinbefore described, to obstruct the flow of fluid from the manifold and thus to cause the development of fluid pressure in the manifold, such pressure, as soon as it becomes great enough to overcome the resistance of the spring 86, moves the piston 78 and thereby imparts swinging movement to the arm 82 the upper end of which is arranged to engage a screw 96 carried toward it by the arm 60 as the valve is operated by the treadle. The piston 78 therefore acts on the arm 60 against the resistance of the spring 58 to prevent the movement of the valve 36 to fully closed position or, it may be, partially to open it if it has thus been fully closed, thereby providing for a more or less restricted flow of fluid from the manifold to dispose of the excess fluid and to limit the maximum pressure developed as determined by the adjustment of the spring 86. If fluid is admitted from the manifold to one or more servomotors immediately upon depression of the treadle, as it actually is in the machine shown in the previously mentioned Letters Patent, the valve may be moved momentarily to fully closed position by the treadle before the pressure in the manifold becomes great enough to move the piston 78; in which case the valve will thereafter be partially opened when the pressure becomes great enough. In the course of the operation of the machine, moreover, the valve will be differently positioned at different times in accordance with the volume of the fluid being utilized to operate the servo-motors, its position, of course, being somewhat affected by the adjustment of the spring 86. In Fig. 2 the parts are shown in the positions which they occupy when the valve is held partially open by the pressure of the fluid, as it is at times in the course of the operation of the machine. It will be understood that when the latch 62 is operated to release the lever 52 at the end of the cycle of operations of the machine, this lever is returned to its initial position and the valve is returned by the spring 40 to its fully open position, as shown in Fig. 1, to cause the pressure in the manifold to drop substantially to zero, the piston 78 being returned to its initial position by the spring 86.

Having described the invention, what I claim as new and desire to secure by Letters Patent of the United States is:

1. In fluid-pressure-controlling mechanism, a pump for delivering fluid from a source of supply to develop fluid pressure, means providing a by-pass for return of the fluid to said source, a valve arranged to control said by-pass and to permit such flow of the fluid as to prevent the development of any substantial fluid pressure when the valve is fully open, means for moving said valve from an initial open position toward closed position to obstruct the flow and thus to cause the development of fluid pressure, and a member separate from said valve and movable by the pressure thus developed for moving the valve toward fully open position and for thereby limiting said pressure by holding the valve partially open.

2. In fluid-pressure-controlling mechanism, a pump for delivering fluid from a source of supply to develop fluid pressure, means providing a by-pass for return of the fluid to said source, a valve arranged to control said by-pass and to permit such flow of the fluid as to prevent the development of any substantial fluid pressure when the valve is fully open, means including a spring for moving said valve yieldingly from an initial open position toward closed position to obstruct the flow and thus to cause the development of fluid pressure, and a piston movable by the pressure thus developed for moving the valve toward fully open position, said piston being arranged to act in opposition to said spring to hold the valve partially open and thereby to limit said pressure.

3. In fluid-pressure-controlling mechanism, a pump for delivering fluid from a source of supply to develop fluid pressure, means providing a by-pass for return of the fluid to said source, a valve arranged to control said by-pass and to permit such flow of the fluid as to prevent the development of any substantial fluid pressure when the valve is fully open, means for moving said valve from an initial open position toward closed position to obstruct the flow and thus to cause the development of fluid pressure, a member movable by the pressure thus developed for moving the valve toward fully open position, said member being arranged to act in opposition to said last-named means to hold the valve partially open and thereby to limit the fluid pressure, a spring against the resistance of which said member is thus movable, and means for adjusting said spring to vary the fluid pressure.

4. In fluid-pressure-controlling mechanism, a pump for delivering fluid from a source of supply to develop fluid pressure, means providing a by-pass for return of the fluid to said source, a valve for controlling the flow of fluid through said by-pass, means for maintaining said valve initially in open position to permit such flow of the fluid as to prevent the development of any substantial fluid pressure, a member movable by the attendant for moving the valve toward closed position to obstruct the flow and thus to cause the development of fluid pressure, a spring for transmitting the force of said member to the valve, a device for holding said member against return movement, and means responsive to the pressure thus developed for moving the valve toward open position, said pressure-responsive means being arranged to hold the valve partially open against the resistance of said spring and thereby to limit said pressure.

5. In fluid-pressure-controlling mechanism, a pump for delivering fluid from a source of supply to develop fluid pressure, means providing a by-pass for return of the fluid to said source, a valve for controlling the flow of fluid through said by-pass, means for maintaining said valve initially in position to permit such flow of the fluid as to prevent the development of any substantial fluid pressure, a lever movable by the attendant for moving the valve toward closed position to obstruct the flow and thus to cause the development of fluid pressure, another lever through which the valve is thus yieldingly movable by said first-named lever, and means subject to the pressure thus developed for controlling said other lever independently of the first-named lever to hold the valve partially open and thereby to limit said pressure.

6. In fluid-pressure-controlling mechanism, a pump for delivering fluid from a source of supply to develop fluid pressure, means providing a by-pass for return of the fluid to said source, a valve arranged to control said by-pass and to permit initially such flow of the fluid as to prevent the development of any substantial fluid pressure, a member movable by the attendant for moving the valve from an initial open position toward closed position to obstruct the flow and thus to cause the development of fluid pressure, a lever through which the valve is thus movable by said member, a spring for transmitting the force of said member to the lever, and a piston movable by the pressure thus developed for moving the valve toward open position, said piston being arranged to act on the lever against the resistance of said spring to limit the pressure by holding the valve partially open.

7. In fluid-pressure-controlling mechanism, a pump for delivering fluid from a source of supply to develop fluid pressure, means providing a by-pass for return of the fluid to said source, a sliding sleeve valve arranged to control said by-pass and to permit initially such flow of the fluid as to prevent the development of any substantial fluid pressure, means for moving said valve from an initial open position into position to obstruct the flow and thereby to cause the development of fluid pressure, and a device movable by the pressure thus developed for moving the valve reversely toward open position, said device being arranged to act in opposition to said last-named means to cause the valve to permit a restricted flow of the fluid and thereby to limit the fluid pressure.

8. In fluid-pressure-controlling mechanism, a pump for delivering fluid from a source of supply to develop fluid pressure, means providing a by-pass for return of the fluid to said source, a slide valve unaffected by any pressure of the fluid against it for controlling the flow of fluid through said by-pass, means for maintaining said valve initially in open position to permit such flow of the fluid as to prevent the development of any substantial fluid pressure, means including a spring for moving the valve yieldingly toward closed position to obstruct the flow and thereby to cause the development of fluid pressure, a member movable by the pressure thus developed for moving the valve toward open position, said member being arranged to act in opposition to said spring to cause the valve to permit a restricted flow of the fluid and thereby to limit the fluid pressure, a spring against the resistance of which said member is thus movable, and means for adjusting said last-named spring to vary the fluid pressure.

9. In fluid-pressure-controlling mechanism, a rotary pump driven at a constant speed for delivering fluid from a source of supply to develop fluid pressure, means providing a by-pass for return of the fluid to said source, a slide valve unaffected by any pressure of the fluid against it for controlling the flow of fluid through said by-pass, a spring for biasing said valve toward closed position to cause it to obstruct the flow of the fluid and thereby to maintain the fluid under pressure, and means subject to the pressure of the fluid and arranged to act in opposition to said spring to move the valve toward open position in response to increase in the pressure to limit the pressure while the speed of the pump remains constant.

10. In fluid-pressure-controlling mechanism, a pump driven at a constant speed for delivering fluid from a source of supply to develop fluid pressure, means providing a by-pass for return of the fluid to said source, a slide valve unaffected by any pressure of the fluid against it for controlling the flow of fluid through said by-pass, a lever for controlling said valve, a spring arranged to act on said lever to bias the valve toward closed position and thus to cause it to maintain the fluid under pressure by obstructing the flow through the by-pass, and a piston movable by the pressure of the fluid and arranged to act on said lever against the resistance of said spring to move the valve toward open position in response to increase in the pressure and thereby to limit the pressure by holding the valve partially open while the speed of the pump remains constant.

BERNHARDT JORGENSEN.

REFERENCES CITED

The following references are of record in the file of this patent:

UNITED STATES PATENTS

| Number | Name | Date |
|---|---|---|
| 718,132 | Lamplough | Jan. 13, 1903 |
| 973,197 | Hicks et al. | Oct. 18, 1910 |
| 1,141,015 | Silvestri | May 25, 1915 |
| 1,650,338 | Fornaca | Nov. 22, 1927 |
| 1,916,433 | Muller | July 4, 1933 |
| 2,057,087 | De Millar | Oct. 13, 1936 |
| 2,324,509 | Jorgensen | July 20, 1943 |
| 2,333,422 | Higgins | Nov. 2, 1943 |